(12) United States Patent
Redl et al.

(10) Patent No.: US 6,958,594 B2
(45) Date of Patent: Oct. 25, 2005

(54) SWITCHED NOISE FILTER CIRCUIT FOR A DC-DC CONVERTER

(75) Inventors: Richard Redl, Farvagny-le-Petit (CH); Yuxin Li, Santa Clara, CA (US); Gabor Reizik, Dublin, CA (US)

(73) Assignee: Analog Devices, Inc., Norwood, MA (US)

(*) Notice: Subject to any disclaimer, the term of this patent is extended or adjusted under 35 U.S.C. 154(b) by 99 days.

(21) Appl. No.: 10/762,650

(22) Filed: Jan. 21, 2004

(65) Prior Publication Data

US 2005/0156582 A1 Jul. 21, 2005

(51) Int. Cl.[7] .................................................. G05F 1/40
(52) U.S. Cl. ....................................... 323/282; 323/284
(58) Field of Search ................................ 323/282, 283, 323/284, 285, 286

(56) References Cited

U.S. PATENT DOCUMENTS

| | | | |
|---|---|---|---|
| 5,747,976 A | * | 5/1998 | Wong et al. ................. 323/282 |
| 5,770,940 A | | 6/1998 | Goder ........................ 323/282 |
| 5,912,552 A | * | 6/1999 | Tateishi ...................... 323/285 |
| 6,201,382 B1 | * | 3/2001 | Kusumoto et al. .......... 323/356 |
| 6,326,772 B2 | * | 12/2001 | Kusumoto et al. .......... 320/166 |
| 6,489,756 B2 | * | 12/2002 | Kanouda et al. ............ 323/284 |
| 2002/0060559 A1 | * | 5/2002 | Umemoto ................... 323/282 |
| 2005/0017702 A1 | * | 1/2005 | Kernahan et al. .......... 323/282 |

* cited by examiner

*Primary Examiner*—Adolf Berhane
(74) *Attorney, Agent, or Firm*—Koppel, Jacobs, Patrick & Heybl

(57) ABSTRACT

A switched noise filter circuit for DC-DC converters which use the instantaneous output voltage to establish the converter's duty ratio. The converter cycles the switching element on and off for time intervals $T_{on}$ and $T_{off}$, respectively. A switching control circuit includes a filter capacitance connected between the feedback node and ground, and a comparator which compares a feedback voltage $V_{fb}$ with a fixed voltage $V_{ref}$; at least one of $T_{on}$ and $T_{off}$ is a "modulated" interval which is terminated when $V_{fb}$ crosses $V_{ref}$ due to the discharge of the filter capacitance. A switched noise filter circuit applies an offset voltage to $V_{fb}$ during at least one of $T_{on}$ and $T_{off}$, with the offset voltage disconnected from $V_{fb}$ by the beginning of the modulated interval or shortly thereafter. When the offset voltage is properly applied, the effect of extraneous electromagnetic noise coupled into $V_{fb}$ is reduced.

34 Claims, 11 Drawing Sheets

SWITCHED NOISE FILTER CIRCUIT FOR A DC-DC CONVERTER

BACKGROUND OF THE INVENTION

1. Field of the Invention

This invention relates to the field of DC-DC converters, and particularly to methods of mitigating the adverse effects of electromagnetic noise sources on such converters.

2. Description of the Related Art

An important class of DC-DC converter uses the instantaneous output voltage to establish the duty ratio required for maintaining a regulated output. This class includes: 1) converters which do not employ a voltage-error amplifier, e.g., the various valley-voltage and peak-voltage regulators, and the hysteretic regulator; and 2) converters that employ the "Vsquare" technique (described, for example, in U.S. Pat. No. 5,770,940).

An example of such a converter is shown in FIG. 1. A switching element 10 is connected between an input voltage $V_{in}$ and a node 12, and an inductor L is connected between node 12 and an output terminal 14 at which a regulated output voltage $V_{out}$ is provided. Switching element 10 is turned on and off periodically. When switching element 10 is closed, $(V_{in}-V_{out})$ is connected across inductor L, such that the current in L ($I_L$) increases. When switching element 10 is open, $I_L$ continues flowing in rectifier diode D, with $I_L$ decreasing due to the voltage ($-V_{out}$) applied across L. This results in $I_L$ having a sequence of rising and falling segments; i.e., essentially a dc current with a superimposed triangular ripple current. Inductor current $I_L$ feeds a load network comprising a capacitance $C_{out}$ and a load 16. $C_{out}$ is selected to have an impedance at the switching frequency that is much less than that of load 16. As such, the ripple component of $I_L$ flows mostly in $C_{out}$, and the dc component flows in the inductor; however, a small ripple voltage component will be present in $V_{out}$ due to $I_L$'S ripple current component.

The switching of element 10 is controlled by a switching control circuit 18, which cycles element 10 on and off once per switching cycle. The common characteristic of converters which use the instantaneous output voltage to establish duty ratio is that a feedback voltage $V_{fb}$ representative of $V_{out}$—typically produced at a feedback node 20 using a resistive divider (R1 and R2) connected between output terminal 14 and the converter's local ground—is connected directly to one of the inputs of a comparator A1. When $V_{fb}$ drops below and/or rises above a reference voltage $V_{ref}$ applied at the comparator's other input, the comparator changes state. Depending on the particular regulation technique employed, this change in state is used to affect the "on" time interval, the "off" time interval, or both the "on" and "off" time intervals of the switching cycle. For example, the regulator in FIG. 1 employs constant-on-time valley-voltage control. A monostable multivibrator (MMV) 22 is triggered when $V_{fb}$ falls below $V_{ref}$, which toggles the MMV's Q output and closes switching element 10 for a fixed (constant) time interval.

These converters are often operated in the immediate vicinity of electromagnetic interference (EMI) noise sources, such as other DC-DC converters. Another switching converter can emit a quickly-varying magnetic field, which can be coupled (via mutual inductance) into feedback voltage $V_{fb}$ as noise. In addition, noise of electrical origin—such as the quickly-changing voltage at the switched node of a converter—can be coupled to feedback node 20 via stray capacitance. Noise in the feedback voltage can lead to jitter, undesirable frequency synchronizations, premature switching, or other malfunctions.

One prior art solution to this problem (shown in FIG. 1) is to add a filter capacitor $C_f$ between feedback node 20 and ground. The capacitor together with divider resistors R1 and R2 form a low-pass RC filter, which attenuates the high-frequency components of noise picked up by the feedback divider. Furthermore, the filter capacitor together with stray capacitance form a capacitive divider, which attenuates the noise on the feedback node.

This solution suffers from several deficiencies. Due to the integrating effect of the RC filter, the magnitude of the ripple voltage component will be reduced. The reduced ripple might be insufficient to ensure jitter-free switching, especially if the unfiltered value of the ripple was already small. Secondly, the RC filter introduces a phase shift into the feedback voltage. This phase shift might reduce the stability margin of the converter, and the converter might become unstable as a result.

SUMMARY OF THE INVENTION

A switched noise filter circuit for a DC-DC converter is presented which overcomes the problems noted above.

The present noise filter circuit is for use with DC-DC converters which use the instantaneous output voltage to regulate the output voltage. The DC-DC converter includes a switching control circuit which cycles the switching element on and off to maintain a desired output voltage, with each switching cycle comprising an "on" time interval $T_{on}$ and an "off" time interval $T_{off}$. The switching control circuit typically includes a resistive divider connected to produce a feedback voltage $V_{fb}$ at a feedback node (with $V_{fb}$ representative of the instantaneous output voltage), a filter capacitance connected between the feedback node and the converter's local ground, and a comparator which receives $V_{fb}$ at its first input and a voltage V2 which varies with a fixed reference voltage $V_{ref}$ at its second input. The switching control circuit is arranged such that at least one of each switching cycle's "on" and "off" time intervals is terminated when $V_{fb}$ crosses V2 due to the natural discharge of the filter capacitance through the resistive divider. Such a time interval is referred to herein as a "modulated" time interval.

The switching control circuit also includes a switched noise filter circuit arranged to apply an offset voltage to $V_{fb}$ during at least one of the "on" and "off" time intervals, with the offset voltage disconnected from the feedback voltage by the beginning of the immediate modulated time interval or shortly thereafter, so that $V_{fb}$ is allowed to gradually decay toward V2. When the offset voltage is properly applied, the effect of extraneous electromagnetic noise coupled into $V_{fb}$ is reduced.

The invention can be used with a wide variety of DC-DC converter configurations, including those employing constant-on-time valley-voltage control, constant-off-time peak-voltage control, constant-frequency peak-voltage or valley-voltage control, hysteretic control, or Vsquare control.

Further features and advantages of the invention will be apparent to those skilled in the art from the following detailed description, taken together with the accompanying drawings.

DETAILED DESCRIPTION OF THE INVENTION

The present switched noise filter circuit reduces the adverse effect of electromagnetic noise on DC-DC converters which employ the instantaneous output voltage to regulate the output voltage. As such, it is useful with many different DC-DC converter configurations, including those employing constant-on-time valley-voltage control, constant-off-time peak-voltage control, constant-frequency peak-voltage or valley-voltage control, hysteretic control, or Vsquare control.

Figure 1:
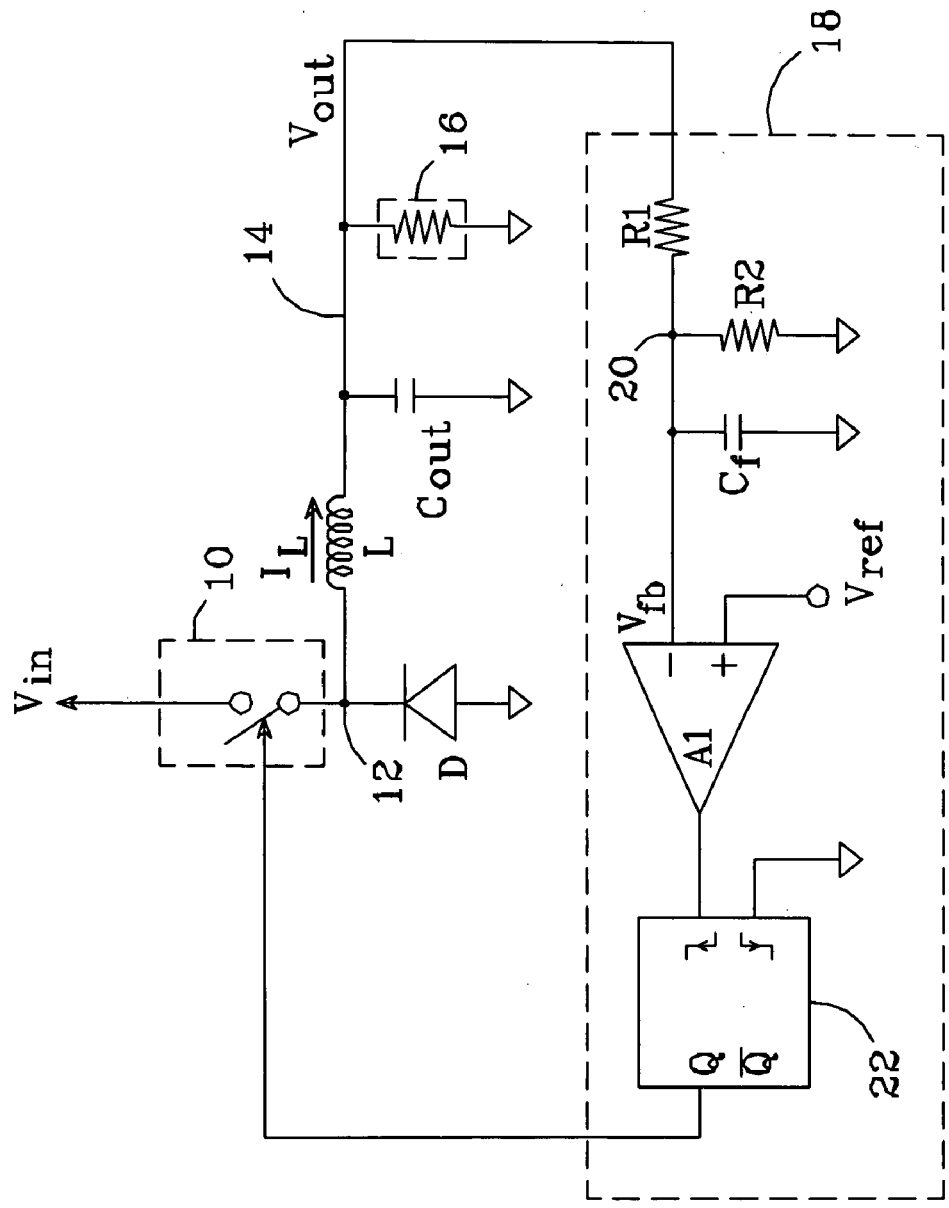
FIG. 1 is a schematic diagram of a known DC-DC converter.
Figure 2:
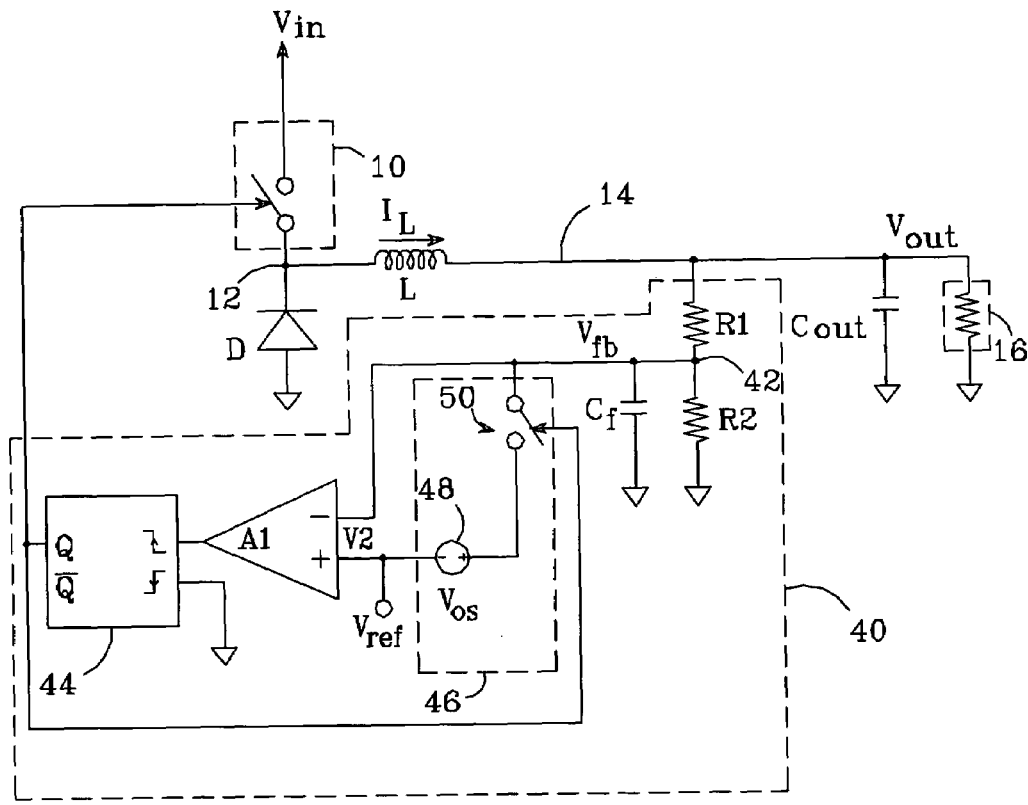
FIG. 2 is a schematic diagram of a switched noise filter circuit per the present invention employed in a DC-DC converter which uses constant-on-time valley-voltage control.

An embodiment of the present invention as it might be used with a DC-DC converter which uses constant-on-time valley-voltage control is shown in FIG. 2. As in FIG. 1, a switching element 10 is connected between input voltage $V_{in}$ and node 12, and inductor L is connected between node 12 and output terminal 14 at which regulated output voltage $V_{out}$ is provided. Inductor current $I_L$ feeds a load network comprising capacitance $C_{out}$ and load 16. The switching of element 10 is controlled by a switching control circuit 40, which cycles element 10 on and off once per switching cycle. Feedback voltage $V_{fb}$ is produced at feedback node 42, typically using a resistive divider R1/R2 connected between output terminal 14 and the converter's local ground; filter capacitor $C_f$ is connected between feedback node 42 and ground. Feedback voltage $V_{fb}$ is connected to one of the inputs of comparator A1, and a voltage V2 which varies with reference voltage $V_{ref}$ (here, $V_{ref}$ itself) is applied at the comparator's other input. When $V_{fb}$ drops below and/or rises above $V_{ref}$, the comparator changes state. A monostable multivibrator (MMV) 44 is triggered when $V_{fb}$ falls below $V_{ref}$, which toggles the MMV's Q output and closes switching element 10. Note that for the converter-types discussed herein, voltage V2 is equal to $V_{ref}$, except for those employing Vsquare control, in which case V2 is equal to the output of the voltage error amplifier (discussed below).

The time interval when switching element 10 is closed is referred to herein as "on" time interval $T_{on}$, and the interval during which switching element 10 is closed is referred to as "off" time interval $T_{off}$. Each of the converter's "switching cycles" includes an "on" time interval followed by an "off" time interval. The switching control circuit 40 for this embodiment, and for all converter configurations for which the present invention is applicable, is arranged such that at least one of each switching cycle's "on" and "off" time intervals is terminated when $V_{fb}$ crosses V2 due to the natural discharge of the filter capacitance through the resistive divider. Such a time interval is referred to herein as a "modulated" time interval.

For the embodiment shown in FIG. 2, when triggered, MMV 44 toggles its Q output and closes switching element 10 for a fixed time interval controlled by the MMV, which establishes the switching cycle's "on" time interval $T_{on}$. This causes $V_{out}$ and $V_{fb}$ to increase, with $V_{fb}$ eventually increasing above $V_{ref}$. At the end of the fixed time interval, the MMV's Q output goes low. $V_{fb}$ will start to decay toward $V_{ref}$ due to the natural discharge of filter capacitor $C_f$ through the R1/R2 divider. The MMV's Q output remains low ("off" time interval $T_{off}$) until $V_{fb}$ again falls below $V_{ref}$ and triggers the MMV. This converter regulation technique is referred to as constant-on-time valley-voltage control.

However, electromagnetic noise coupled into feedback voltage $V_{fb}$, via mutual inductance or stray capacitance coupled from an adjacent converter, for example, can lead to jitter, undesirable frequency synchronization, premature switching, or other malfunctions. This problem is mitigated with the use of a switched noise filter circuit which is incorporated into switching control circuit 40. The switched noise filter circuit is arranged to apply an offset voltage $V_{os}$ to feedback voltage $V_{fb}$ during at least one of the switching cycle's "on" and "off" time intervals, and then for this embodiment—and for all converter configurations for which the present invention is applicable—disconnecting the offset voltage source from feedback node 42 by the beginning of the immediate modulated interval or shortly thereafter, so that $V_{fb}$ is allowed to gradually decay toward V2 due to the natural discharge of filter capacitor $C_f$ through the resistive divider. By so doing, the adverse effects related to the coupling of extraneous electromagnetic noise into the feedback voltage are reduced. When the offset voltage is applied during the modulated interval, the "immediate modulated interval" refers to the current time interval. When the offset voltage is applied during the time interval prior to the modulated interval, the "immediate modulated interval" refers to the subsequent time interval. In the exemplary embodiment shown in FIG. 2, switched noise filter circuit 46 comprises a voltage source 48 which produces an offset voltage $V_{os}$ at its output, and an offset voltage switch 50 connected between the output of voltage source 48 and $V_{fb}$. Offset voltage $V_{os}$ is preferably referred to reference voltage $V_{ref}$. Offset voltage switch 50 is controlled by the Q output of MMV 44, such that it is closed whenever switching element 10 is closed. In this way, $V_{os}$ is added to feedback voltage $V_{fb}$ during the switching cycle's "on" time interval, and is disconnected from $V_{fb}$ at the beginning of and throughout the switching cycle's "off" time interval. When $V_{os}$ is disconnected—i.e., during $T_{off}$—$V_{fb}$ is allowed to gradually decay toward V2 due to the natural discharge of filter capacitor $C_f$ through the resistive divider.

Figure 3:
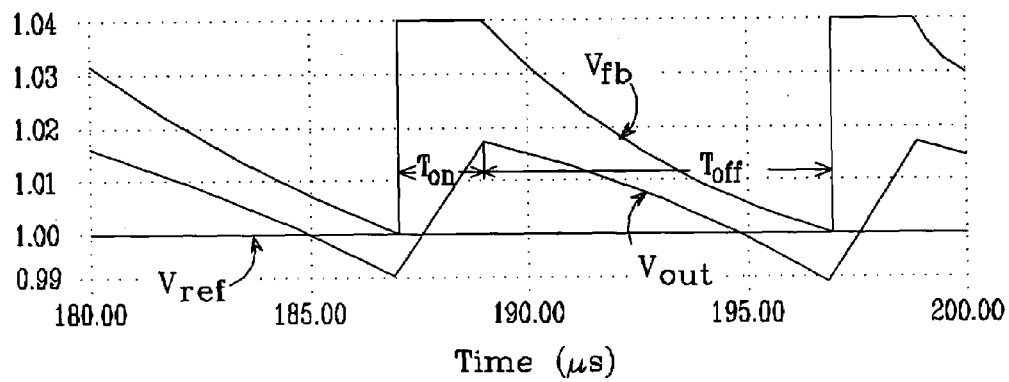
FIG. 3 is a timing diagram which illustrates the operation of the DC-DC converter shown in FIG. 2.

When so arranged, a timing diagram such as that shown in FIG. 3 is obtained, which depicts $V_{out}$, $V_{ref}$, and $V_{fb}$ over several switching cycles. Offset voltage $V_{os}$ is added to $V_{fb}$ during $T_{on}$, pulling feedback node 42 up to a fixed voltage ($V_{ref}+V_{os}$=1V+40 mV=1.04V in this example); this increases the voltage difference between $V_{fb}$ and $V_{ref}$ and thereby increases the noise margin. With an increased noise margin, the effect of noise picked up at feedback voltage node 42 is reduced.

As noted above, the offset voltage must be disconnected from feedback node 42 by the beginning of the immediate modulated interval or shortly thereafter. In this case, $T_{off}$ is the immediate modulated time interval. $V_{os}$ is applied for the entire duration of $T_{on}$, and is disconnected from feedback node 42 by the beginning of subsequent interval $T_{off}$, allowing $V_{fb}$ to gradually decay toward V2 due to the natural discharge of filter capacitor $C_f$ through the resistive divider.

In DC-DC converters which employ constant on-time control (either valley-voltage or Vsquare), the offset voltage should be applied during $T_{on}$, or for a brief period at the very beginning of $T_{off}$. In converters with constant off-time control (either peak-voltage or Vsquare), the offset voltage should be applied during $T_{off}$, or for a brief period at the very beginning of $T_{on}$. In converters with constant-frequency control, the offset voltage should be applied after $V_{fb}$ has decayed to V2, and preferably be disconnected when the clock pulse appears (although it could be disconnected earlier, too). In converters with hysteretic control (including the hysteretic version of Vsquare), both $T_{on}$ and $T_{off}$ are terminated when $V_{fb}$ decays to V2; here, the offset voltage is bidirectional and must be applied right after the threshold crossings, and preferably for a short interval only.

Note that it is not necessary that $V_{os}$ be applied for an the entire duration of a time interval—it need only be applied for a portion of a time interval. $V_{os}$ should be present before the ripple voltage component of $V_{out}$ would initiate a switching instant, and is preferably applied at the beginning of a time interval—so that the protection provided by the switched noise filter circuit against noise-induced switching extends to the better part of the interval.

When the switched noise filter circuit is active during a time interval having a duration which is not fixed with, for example, a MMV, the use of the present switched noise filter circuit may alter the duration of the time interval—as it shifts the valley or peak of the output voltage slightly down or up. However, this shift is typically less than 1% of the output voltage, which is generally acceptable.

Though the RC filter formed by $C_f$, R1 and R2 still tend to reduce the magnitude of the ripple voltage present in $V_{fb}$, this is compensated for by the application of offset voltage $V_{os}$.

Figure 4:
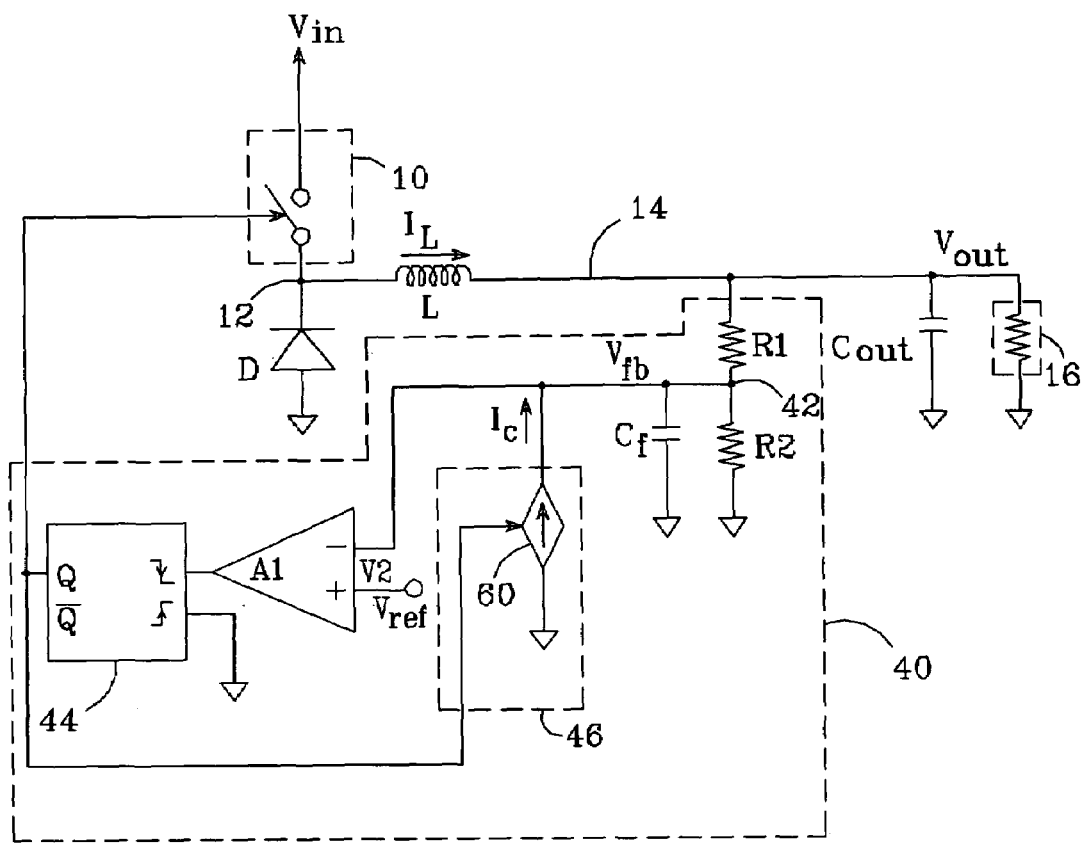
FIG. 4 is a schematic diagram of an alternative embodiment of a switched noise filter circuit per the present invention employed in a DC-DC converter which uses constant-on valley-voltage control.

Another possible embodiment of the present invention as it might be used with a DC-DC converter which uses constant-on-time valley-voltage control is shown in FIG. 4. This configuration is similar to that shown in FIG. 2, except that the switched noise filter circuit 46 in switching control circuit 40 comprises a current source 60. Current source 60 is controlled by the Q output of MMV 44, such that it is activated and produces a charging current $I_c$ whenever switching element 10 is closed, and is de-activated when switching element 10 is open; note that, as used herein, "de-activating" the current source is the equivalent of "disconnecting" the offset voltage. When activated, current source 60 charges filter capacitor $C_f$ with charging current $I_c$. This causes feedback voltage $V_{fb}$ to be increased during the switching cycle's "on" time interval.

Figure 5:
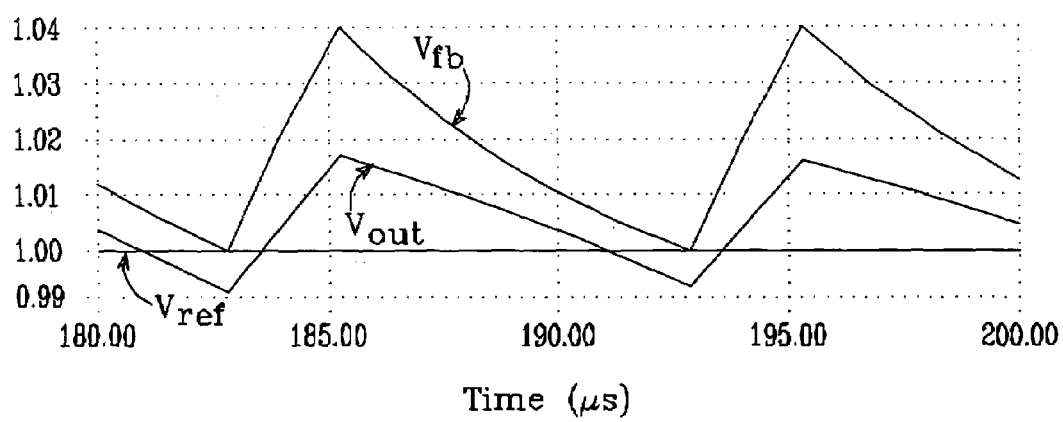
FIG. 5 is a timing diagram which illustrates the operation of the DC-DC converter shown in FIG. 4.

When so arranged, a timing diagram such as that shown in FIG. 5 is obtained, which depicts $V_{out}$, $V_{ref}$(=V2), and $V_{fb}$ over several switching cycles. Charging current $I_c$ is supplied to feedback node 42 and charges $C_f$ during $T_{on}$, increasing the magnitude of feedback voltage $V_{fb}$; this increases the voltage difference between $V_{fb}$ and $V_{ref}$ and thereby increases the noise margin and reduces the effect of noise picked up at feedback voltage node 42. As required by the invention, charging current $I_c$ is reduced to zero by the beginning of the immediate modulated interval or shortly thereafter. In this case, $T_{off}$ is the immediate modulated interval. IC is applied for the entire duration of $T_{on}$, and is reduced to zero at the beginning of subsequent interval $T_{off}$, allowing $V_{fb}$ to gradually decay toward V2 due to the natural discharge of filter capacitor $C_f$ through the resistive divider.

Note that charging current $I_c$ may be a constant current, a varying current, or a current pulse; it is only necessary that the charging current provide a net charge of the proper polarity by the end of the switching cycle time interval during which current source 60 is activated.

Figure 6:
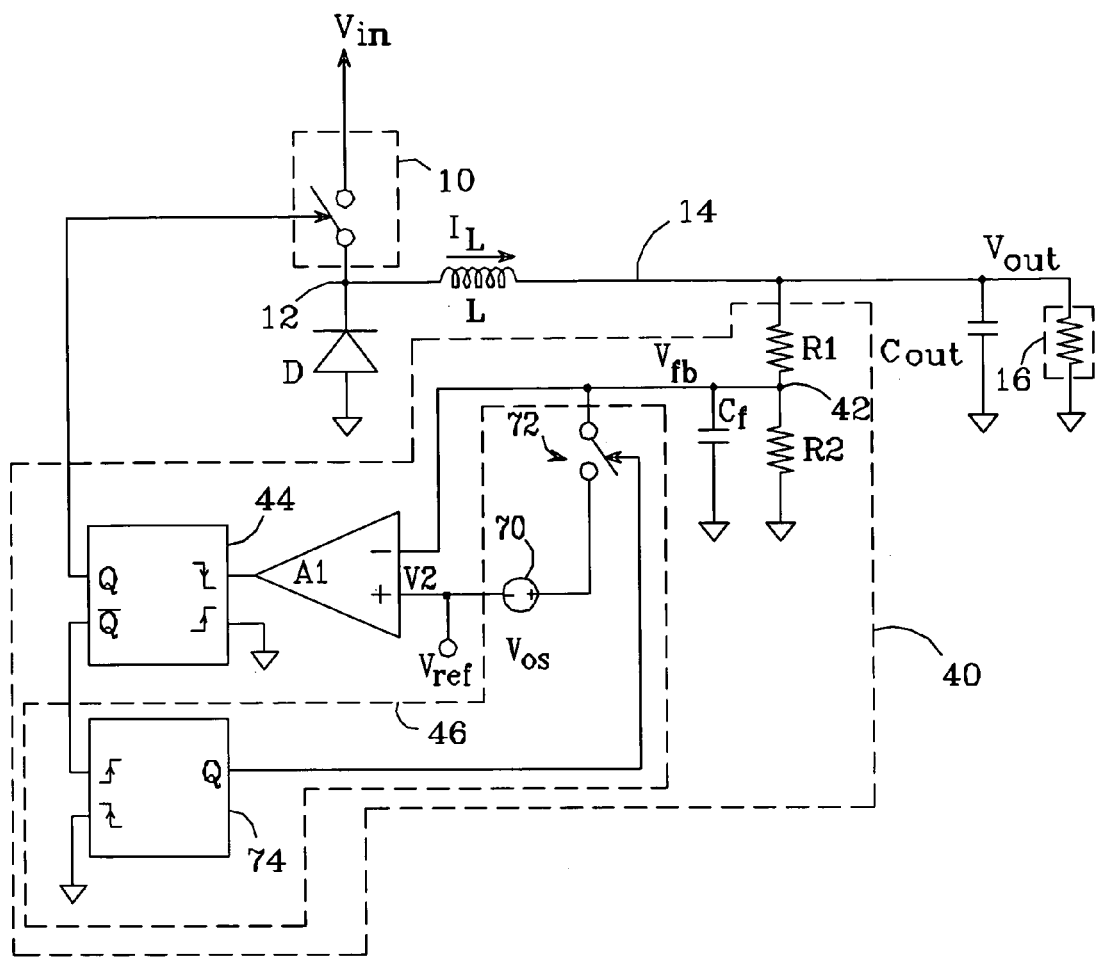
FIG. 6 is a schematic diagram of another alternative embodiment of a switched noise filter circuit per the present invention employed in a DC-DC converter which uses constant-on valley-voltage control.

In FIGS. 2–5 above, an offset voltage is applied to feedback node 42 during "on" time interval $T_{on}$. The offset voltage can alternatively be applied during the "off" time interval $T_{off}$. This is illustrated in FIG. 6, which depicts an embodiment of the present invention as it might be used with a DC-DC converter which uses constant-on-time valley-voltage control, with the offset voltage applied during the "off" time. This configuration is similar to that shown in FIG. 2, except that here the switched noise filter circuit 46 in switching control circuit 40 comprises a voltage source 70 which produces an offset voltage $V_{os}$ at its output, an offset voltage switch 72 connected between the output of voltage source 70 and $V_{fb}$, and a second MMV 74.

Offset voltage switch 72 is controlled by the Q output of MMV 74, which is triggered by the $\overline{Q}$ output of MMV 44. When so arranged, MMV 74 is triggered when switching element 10 is opened—i.e., at the beginning of $T_{off}$—and closes offset switch 72 for a fixed time interval established by MMV 74. In this way, switch 72 is closed and $V_{os}$ is added to feedback voltage $V_{fb}$ for a fixed time interval during $T_{off}$, and is open throughout the switching cycle's "on" time interval.

Figure 7:
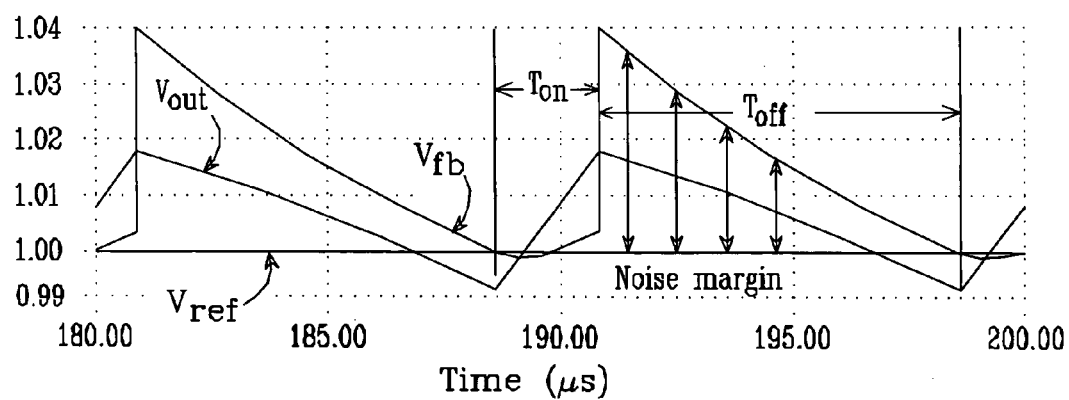
FIG. 7 is a timing diagram which illustrates the operation of the DC-DC converter shown in FIG. 6.

When so arranged, a timing diagram such as that shown in FIG. 7 is obtained, which depicts $V_{out}$, $V_{ref}(=V2)$, and $V_{fb}$ over several switching cycles. Offset voltage $V_{os}$ is added to $V_{fb}$ during $T_{off}$, pulling feedback node 42 up (to a voltage $V_{ref}+V_{os}=1V+40$ mV=1.04V in this example); this increases the voltage difference between $V_{fb}$ and $V_{ref}$ and thereby increases the noise margin. With an increased noise margin, the effect of noise picked up at feedback voltage node 42 is reduced.

As noted above, the offset voltage must be disconnected from feedback node 42 by the beginning of the immediate modulated interval or shortly thereafter. In this case, $V_{os}$ is applied during $T_{off}$, and $T_{off}$ is also the immediate modulated interval. Therefore, it is necessary that $V_{os}$ be applied for a short interval T at the beginning of $T_{off}$, with T<<$T_{off}$ (preferably 10% or less of $T_{off}$)—such that the offset voltage decays to zero or near-zero by the end of $T_{off}$. This is necessary to ensure that the effect of the offset voltage on the normal pulse-width modulation (PWM) process—and on the nominal converter operation itself—is negligible. Thus, when applying $V_{os}$ during the "off" interval, the time constant $C_f(R1\|R2)$ and the duration and termination of the $V_{os}$ pulse, should be adjusted such that $V_{os}$ is zero or near-zero by the end of the interval during which it is applied—which in this case is "off" interval $T_{off}$. If $V_{os}$ does not decay to close to zero during the expected time, $V_{out}$ will be adjusted such that the sum of the remaining offset voltage and $V_{fb}$ equal $V_{ref}$, thereby causing $V_{out}$ to deviate from the desired value.

The voltage source 70 and offset voltage switch 72 might alternatively be implemented with a current source (not shown), which is activated to charge filter capacitor $C_f$ with a charging current for at least a portion of "off" time interval $T_{off}$, and is de-activated throughout the switching cycle's "on" time interval.

Figure 8:
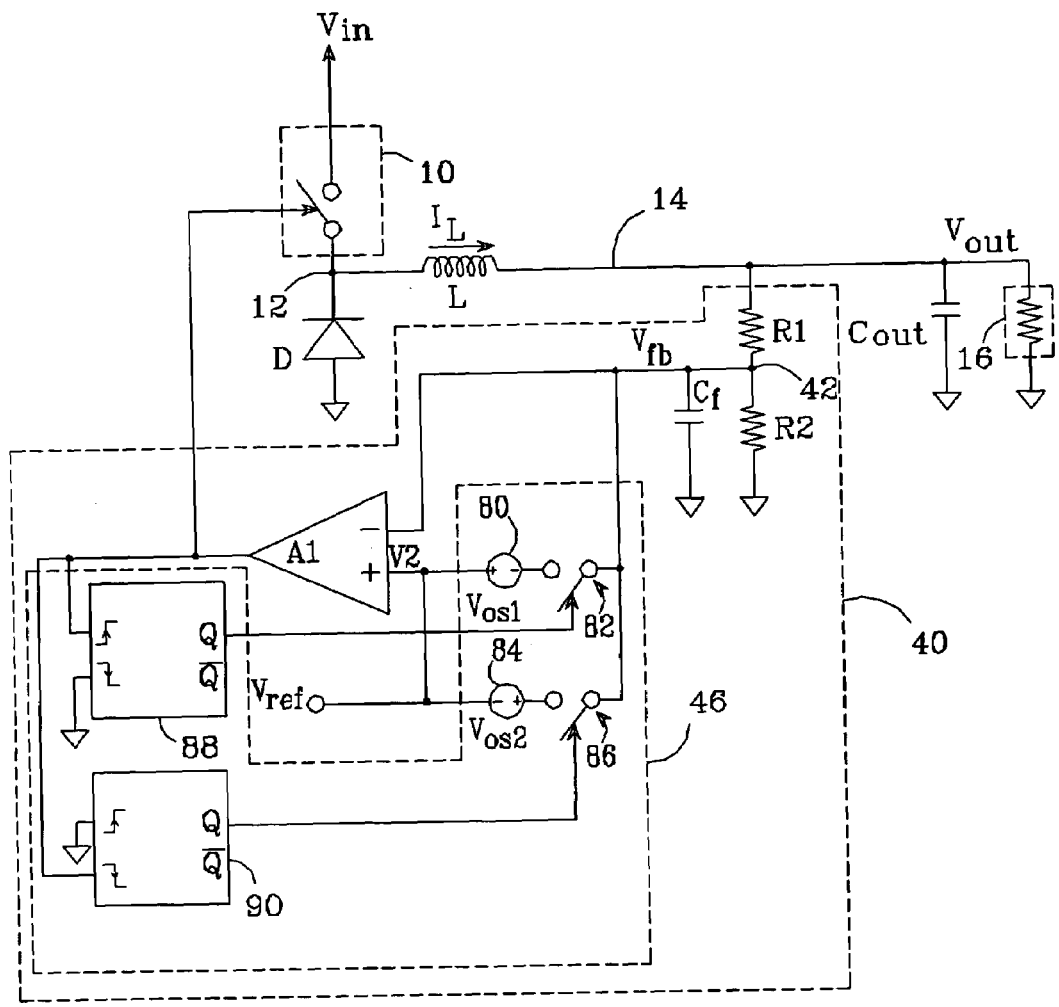
FIG. 8 is a schematic diagram of a switched noise filter circuit per the present invention employed in a DC-DC converter which uses hysteretic control.

The present switched noise filter circuit can also be employed with a DC-DC converter using hysteretic control. Such a converter is shown in FIG. 8. In this case, the switched noise filter circuit is arranged to subtract an offset voltage $V_{os1}$ from feedback voltage $V_{fb}$ during the switching cycle's "on" time interval, and to add an offset voltage $V_{OS2}$ to feedback voltage $V_{fb}$ during the switching cycle's "off" time interval, with both $V_{os1}$ and $V_{os2}$ reduced to zero by the end of the time intervals during which they are applied.

In the exemplary embodiment shown in FIG. 8, comparator A1 has an associated hysteresis voltage $V_{hyst}$. This results in an upper threshold voltage $V_{uth}=V_{ref}+(V_{hyst}/2)$, and a lower threshold voltage $V_{lth}=V_{ref}-(V_{hyst}/2)$. The output of A1 is connected directly to switching element 10. In operation, $V_{fb}$ needs to fall below $V_{lth}$ to turn on switching element 10, and $V_{fb}$ needs to rise above $V_{uth}$ to turn off switching element 10, thereby providing hysteretic control.

Switched noise filter circuit 46 comprises a first voltage source 80 which produces offset voltage $V_{os1}$ at its output, a first offset voltage switch 82 connected between the output of voltage source 80 and $V_{fb}$, a second voltage source 84 which produces offset voltage $V_{os2}$ at its output, a second offset voltage switch 86 connected between the output of voltage source 84 and $V_{fb}$, and first and second MMVs 88 and 90. Offset voltages $V_{os}$ and $V_{os2}$ are preferably referred to reference voltage $V_{ref}$.

Offset voltage switch 82 is controlled by the Q output of MMV 88, which is triggered to toggle its Q output for a fixed time interval at the start of "on" time interval $T_{on}$. Similarly, offset voltage switch 86 is controlled by the Q output of a MMV 90, which is triggered to toggle its Q output for a fixed time interval at the start of "off" time interval $T_{off}$. When so arranged, $V_{os1}$ is subtracted from feedback voltage $V_{fb}$ at the beginning of $T_{on}$, and $V_{os2}$ is added to feedback voltage $V_{fb}$ at the beginning of $T_{off}$.

Figure 9:
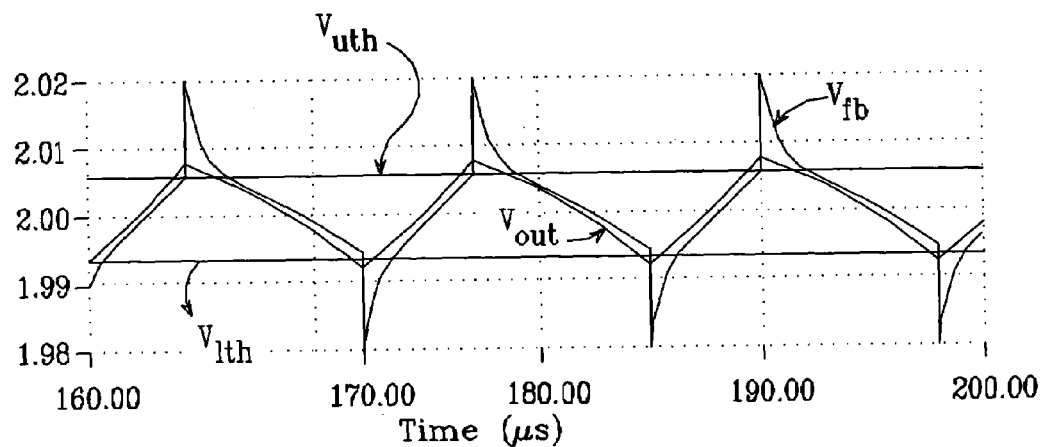
FIG. 9 is a timing diagram which illustrates the operation of the DC-DC converter shown in FIG. 8.

The resulting waveforms are shown in FIG. 9. As noted above, the offset voltage must be disconnected from feedback node 42 by the beginning of the immediate modulated interval or shortly thereafter. In this case, an offset voltage is applied during $T_{on}$ and $T_{off}$, and both $T_{on}$ and $T_{off}$ are terminated when $V_{fb}$ crosses V2; thus, both $T_{on}$ and $T_{off}$ are immediate modulated intervals. Therefore, it is necessary that $V_{os1}$ be applied for a short interval T1 at the beginning of $T_{on}$, with T1<<$T_{off}$, and $V_{os}$ be applied for a short interval T2 at the beginning of $T_{off}$, with T2<<$T_{off}$, such that the offset voltages decay to zero or near-zero by the end of their respective intervals.

Figure 10:
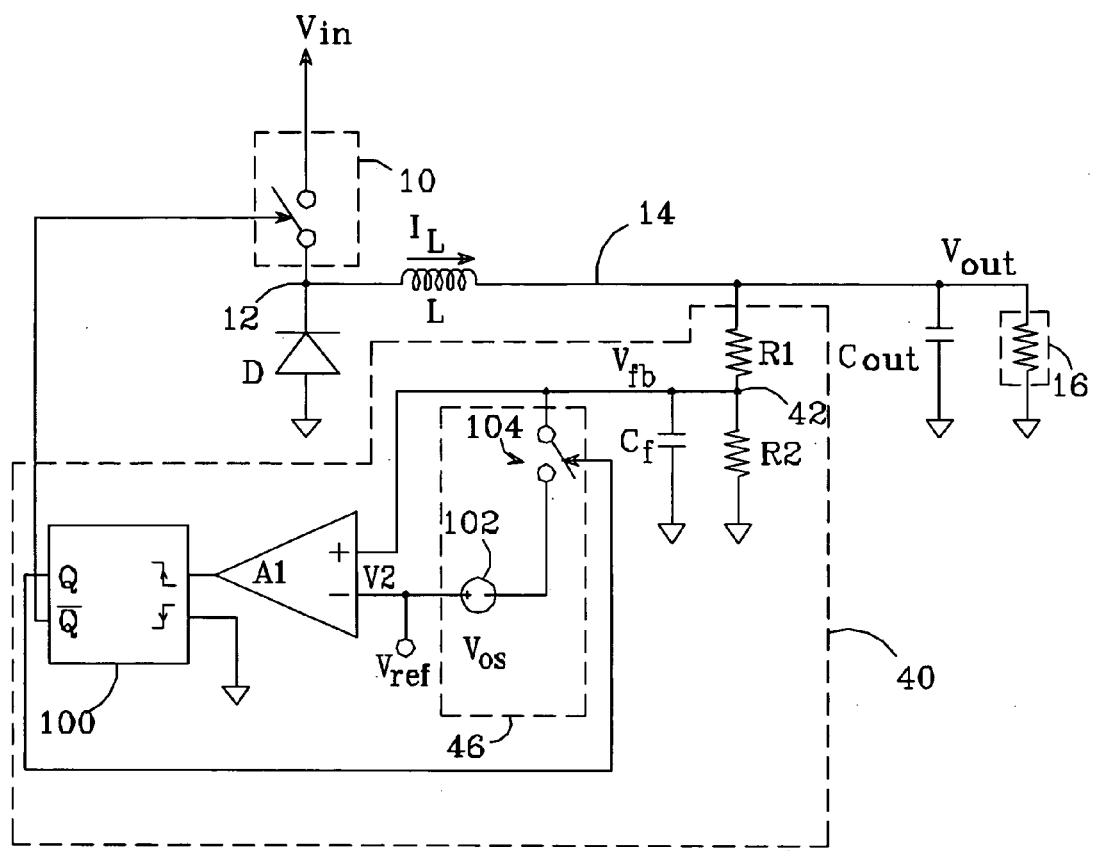
FIG. 10 is a schematic diagram of a switched noise filter circuit per the present invention employed in a DC-DC converter which uses constant-off-time peak-voltage control.

The present switched noise filter circuit can also be employed with a DC-DC converter using constant-off-time peak-voltage control; such a converter is shown in FIG. 10. Here, feedback voltage $V_{fb}$ is connected to the non-inverting input of A1, reference voltage $V_{ref}(=V^2)$ is connected to A1's inverting input, and A1's output is connected to trigger a MMV 100 when $V_{fb}$ rises above $V_{ref}$. The $\overline{Q}$ output of MMV 100 is connected to switching element 10, so that switching element 10 is opened for a predetermined time interval set by MMV 100 when $V_{fb}$ rises above $V_{ref}$ — thereby providing constant-off-time peak-voltage control.

In this embodiment, switched noise filter circuit 46 comprises a voltage source 102 which produces an offset voltage $V_{os}$ at its output, and an offset voltage switch 104 connected between the output of voltage source 102 and $V_{fb}$. Offset voltage switch 104 is controlled by the Q output of MMV 100, such that it is closed whenever switching element 10 is open. In this way, $V_{os}$ is subtracted from feedback voltage $V_{fb}$ during the switching cycle's "off" time interval, and is disconnected from feedback node 42 during the switching cycle's "on" time interval.

Figure 11:
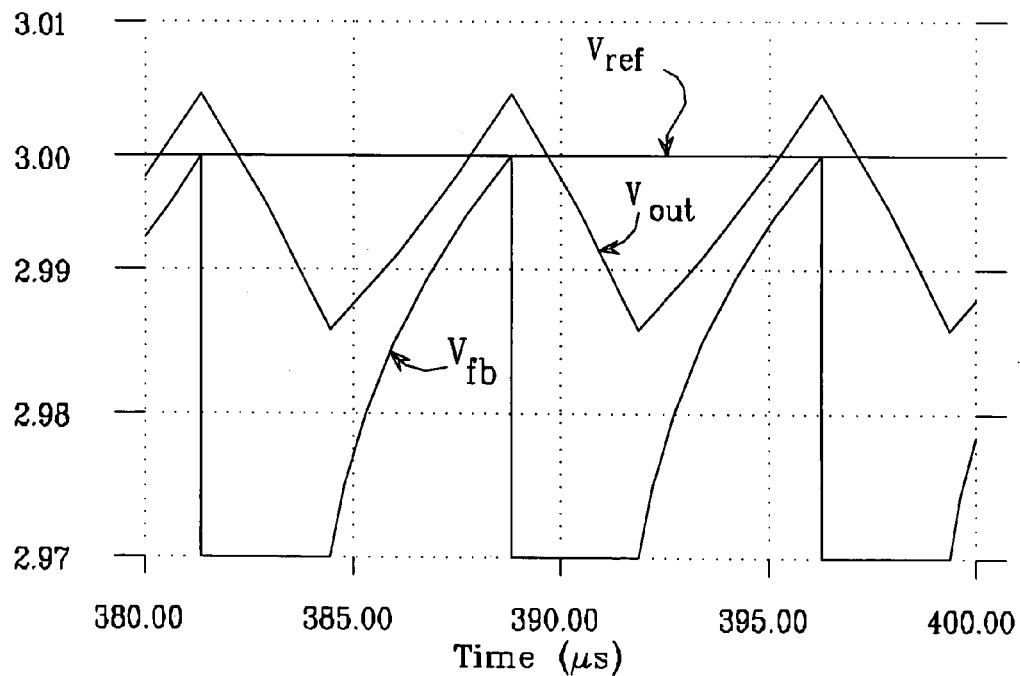
FIG. 11 is a timing diagram which illustrates the operation of the DC-DC converter shown in FIG. 10.

When so arranged, a timing diagram such as that shown in FIG. 11 is obtained. Offset voltage $V_{os}$ is subtracted from $V_{fb}$ during $T_{off}$, pulling feedback node 42 down to a fixed voltage ($V_{ref}-V_{os}=3V-30$ mV=2.97V in this example); this increases the voltage difference between $V_{fb}$ and $V_{ref}$ and thereby increases the noise margin. With an increased noise margin, the effect of noise picked up at feedback voltage node 42 is reduced.

Again, the offset voltage must be disconnected from feedback node 42 by the beginning of the immediate modulated interval. In this case, $T_{on}$ is the modulated interval. $V_{os}$ is applied for the entire duration of $T_{off}$, and is disconnected from feedback node 42 by the beginning of subsequent interval $T_{on}$, allowing $V_{fb}$ to gradually decay toward V2 due to the natural discharge of filter capacitor $C_f$ through the resistive divider.

Figure 12A:
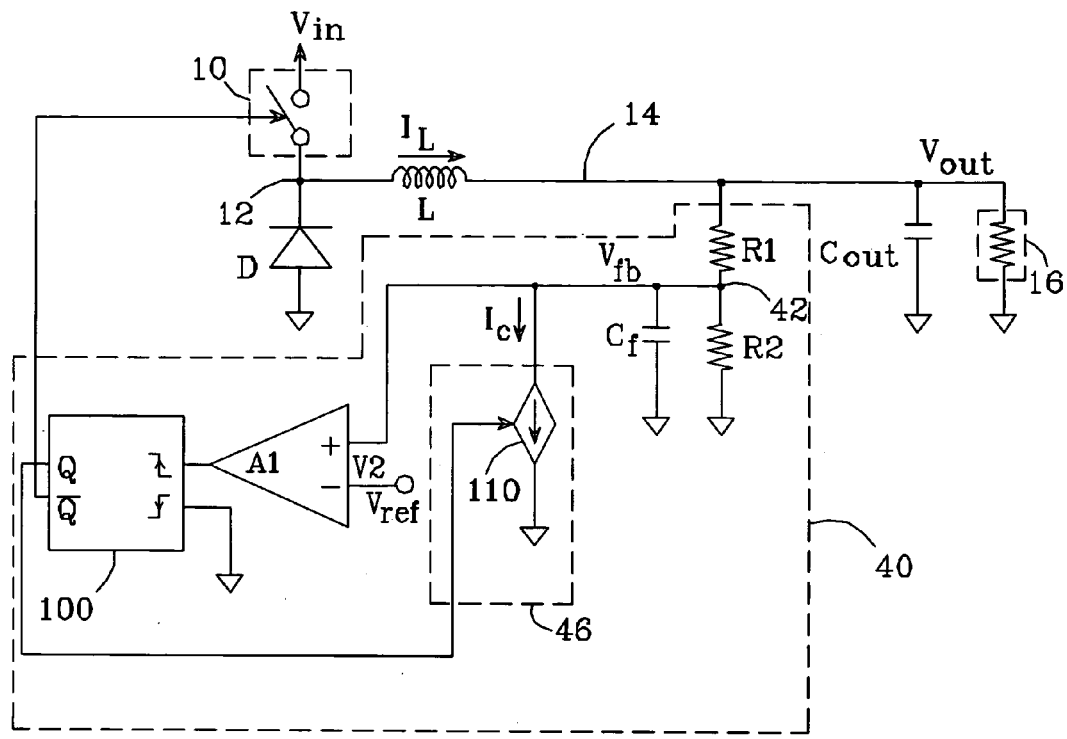
FIG. 12a is a schematic diagram of an alternative embodiment of a switched noise filter circuit per the present invention employed in a DC-DC converter which uses constant-off-time peak-voltage control.
Figure 12B:
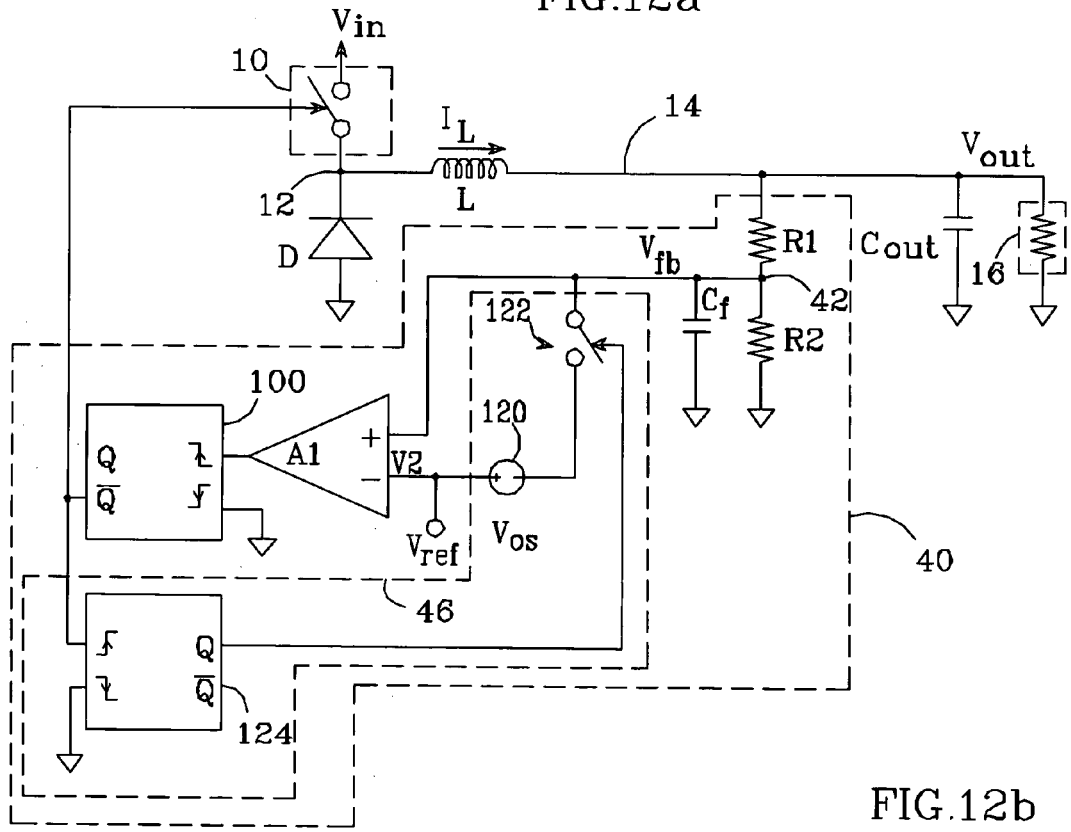
FIG. 12b is a schematic diagram of another alternative embodiment of a switched noise filter circuit per the present invention employed in a DC-DC converter which uses constant-off-time peak-voltage control.

Alternative embodiments of DC-DC converters which use constant-off-time peak-voltage control and employ the present switched noise filter circuit are shown in FIGS. 12a and 12b. The configuration shown in FIG. 12a is similar to that shown in FIG. 4: switched noise filter circuit 46 comprises a current source 110 which is controlled by the Q output of MMV 100, such that it is activated and provides a discharging current $I_c$ whenever switching element 10 is open, and is de-activated when switching element 10 is closed. When activated during the "off"-time interval, current source 110 discharges filter capacitor $C_f$ with discharging current $I_c$. This causes feedback voltage $V_{fb}$ to be decreased during the switching cycle's "off" time interval, such that an improved noise margin is obtained.

In FIG. 12b, a fixed offset voltage is subtracted from the feedback voltage at the beginning of the "on" time interval. This configuration is similar to that shown in FIG. 6: switched noise filter circuit 46 comprises a voltage source 120 which produces an offset voltage $V_{os}$ at its output, an offset voltage switch 122 connected between the output of voltage source 120 and $V_{fb}$, and a second MMV 124. Offset voltage switch 122 is controlled by the Q output of MMV 124, which is triggered by the $\overline{Q}$ output of MMV 100. When so arranged, MMV 124 is triggered when switching element 10 is closed—i.e., at the beginning of $T_{on}$—and closes offset switch 122 for a fixed time interval controlled by MMV 124. In this way, switch 122 is closed and $V_{os}$ is subtracted from feedback voltage $V_{fb}$ for a fixed time interval during $T_{on}$, and is open throughout the switching cycle's "off" time interval.

Offset voltage $V_{os}$ should be applied for a short interval T at the beginning of $T_{on}$, with T<<$T_{on}$ (preferably 10% or less of $T_{off}$)—such that the offset voltage decays to zero or near-zero by the end of $T_{on}$. This is necessary to ensure that the effect of the offset voltage on the normal PWM process, and on the nominal converter operation itself, is negligible.

Figure 13:
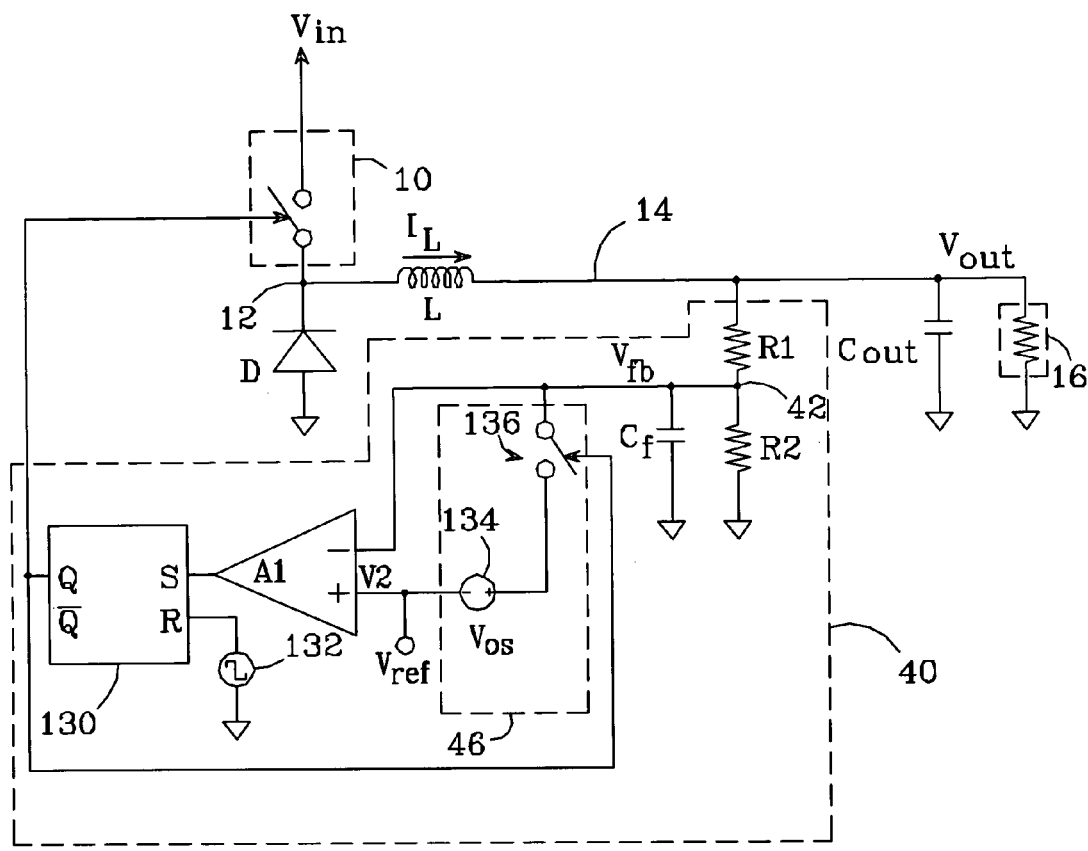
FIG. 13 is a schematic diagram of a switched noise filter circuit per the present invention employed in a DC-DC converter which uses constant-frequency valley-voltage control.

The invention is also applicable to DC-DC converters using constant-frequency peak-voltage or valley-voltage control. An exemplary embodiment of a DC-DC converter using constant-frequency valley-voltage control which employs the present switched noise filter circuit is shown in FIG. 13. Here, the output of comparator A1 is connected to the set input of an S-R latch 130, with the latch's reset input connected to a periodic clock signal 132. The latch's Q output controls switching element 10. When $V_{fb}$ falls below $V_{ref}$(=V2), the output of A1 toggles and sets the latch's Q output, causing switching element 10 to be closed. Switching element 10 remains closed until the next tick of periodic clock signal 132, which resets the latch.

In this embodiment, switched noise filter circuit 46 comprises a voltage source 134 which produces an offset voltage $V_{os}$ at its output, and an offset voltage switch 136 connected between the output of voltage source 134 and $V_{fb}$. Offset voltage switch 136 is controlled by the Q output of S-R latch 130 such that it is closed whenever switching element 10 is closed. In this way, $V_{os}$ is added to feedback voltage $V_{fb}$ during the switching cycle's "on" time interval, and is zero during the switching cycle's "off" time interval.

Figure 14:
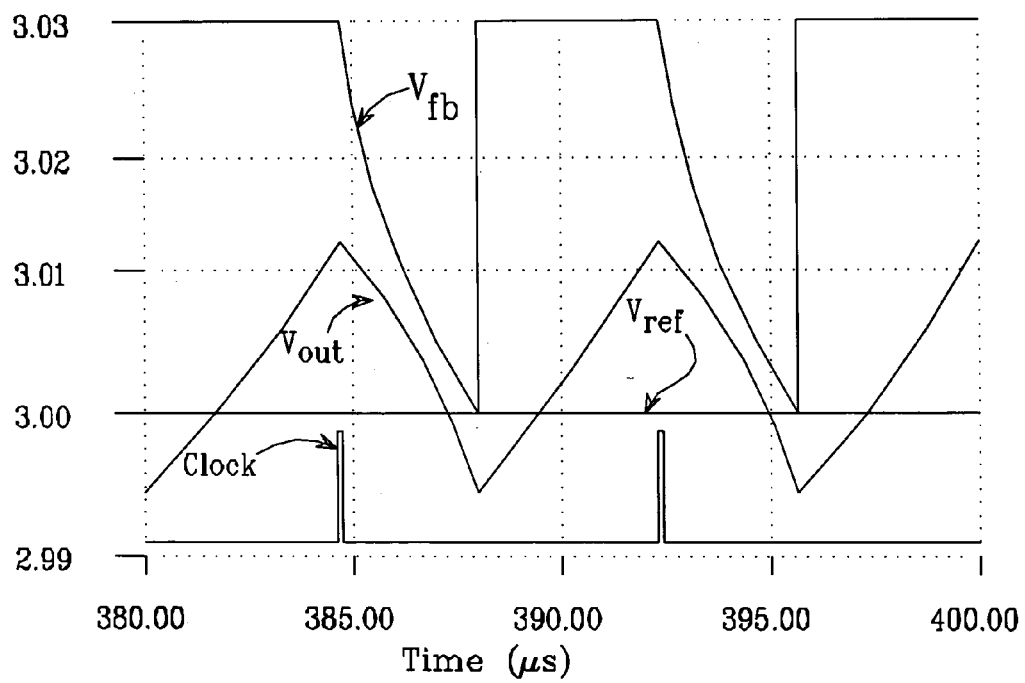
FIG. 14 is a timing diagram which illustrates the operation of the DC-DC converter shown in FIG. 13.

When so arranged, a timing diagram such as that shown in FIG. 14 is obtained. Offset voltage $V_{os}$ is added to $V_{fb}$ during $T_{on}$, pulling feedback node 42 up to a fixed voltage ($V_{ref}+V_{os}$=3V+30 mV=3.03V in this example); this increases the voltage difference between $V_{fb}$ and $V_{ref}$ and thereby increases the noise margin. With an increased noise margin, the effect of noise picked up at feedback voltage node 42 is reduced. In this case, $T_{off}$ is the immediate modulated interval. $V_{os}$ is applied for the entire duration of $T_{on}$, and is disconnected from feedback node 42 at the beginning of subsequent interval $T_{off}$, allowing $V_{fb}$ to gradually decay toward V2 due to the natural discharge of filter capacitor $C_f$ through the resistive divider.

Figure 15A:
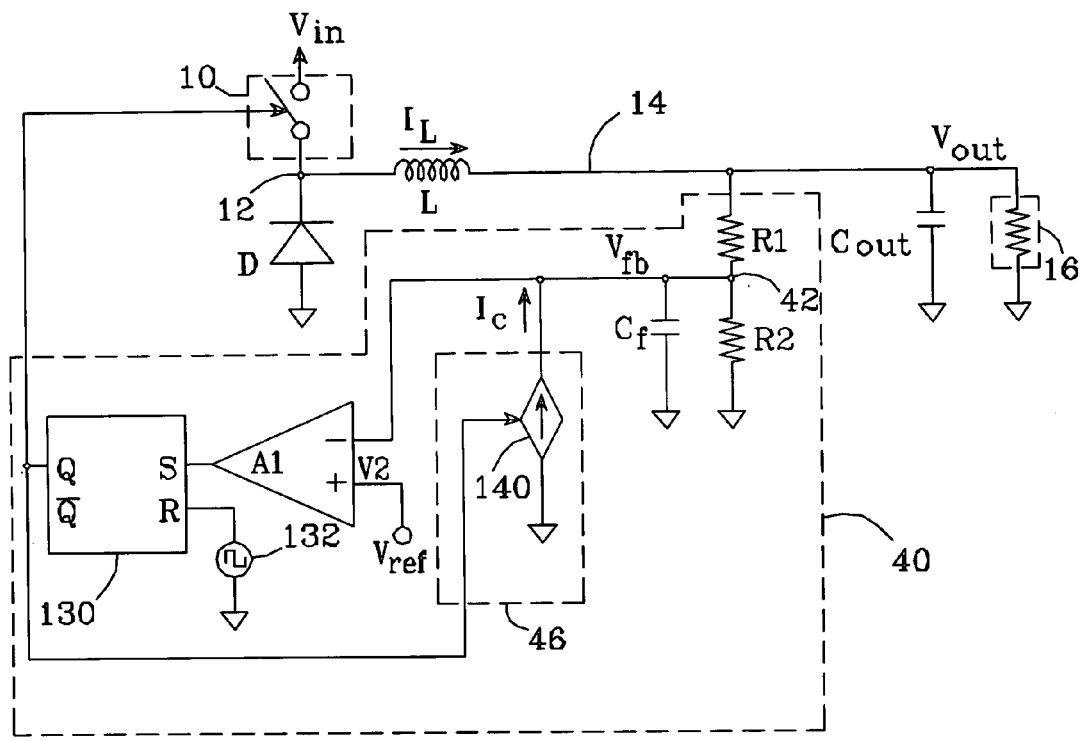
FIG. 15a is a schematic diagram of an alternative embodiment of a switched noise filter circuit per the present invention employed in a DC-DC converter which uses constant-frequency valley-voltage control.
Figure 15B:
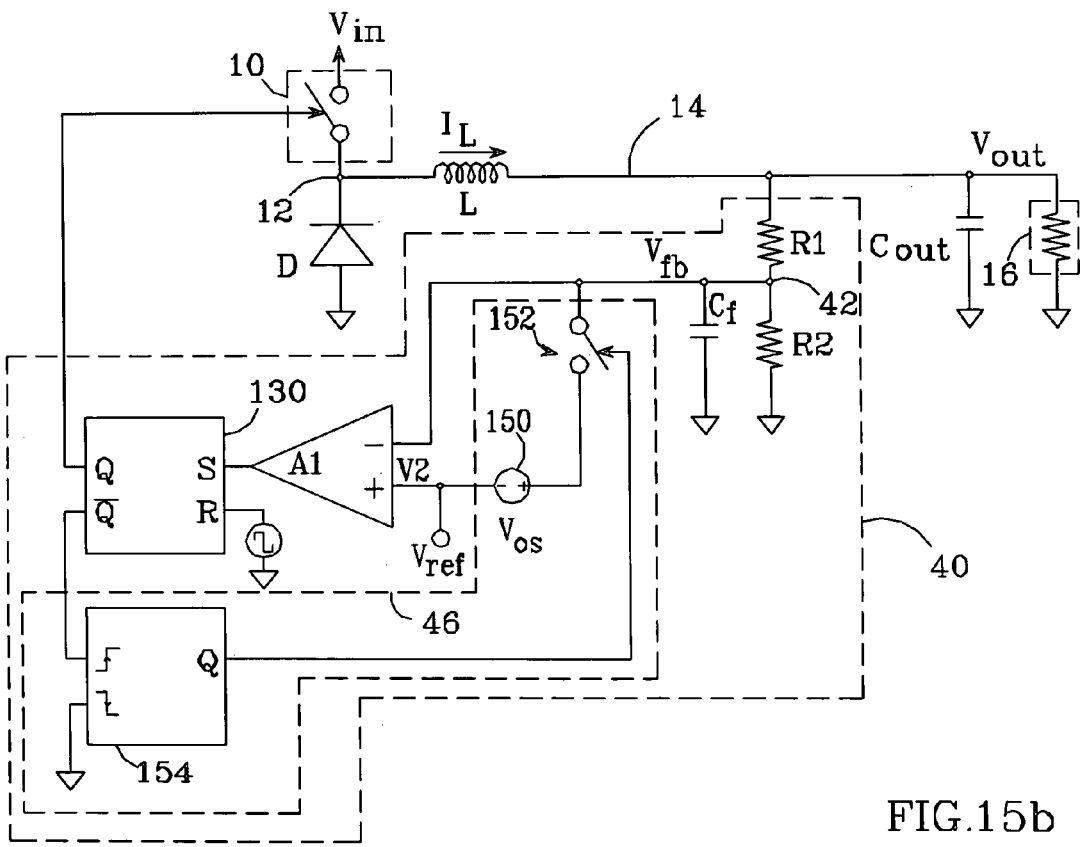
FIG. 15b is a schematic diagram of another alternative embodiment of a switched noise filter circuit per the present invention employed in a DC-DC converter which uses constant-frequency valley-voltage control.

Alternative embodiments of DC-DC converters which use constant-frequency valley-voltage control and employ the present switched noise filter circuit are shown in FIGS. 15a and 15b. The configuration shown in FIG. 15a is similar to that shown in FIGS. 4 and 12a: switched noise filter circuit 46 comprises a current source 140 which is controlled by the Q output of latch 130, such that it is activated and produces a charging current $I_c$ whenever switching element 10 is closed, and is de-activated when switching element 10 is open. When activated during the "on" time interval, current source 110 charges filter capacitor $C_f$ with charging current $I_c$. This causes feedback voltage $V_{fb}$ to be increased during the switching cycle's "on" time interval such that an improved noise margin is obtained.

In FIG. 15b, a fixed offset voltage is added to the feedback voltage at the beginning of the "off" time interval. The configuration shown in FIG. 15b is similar to that shown in FIGS. 6 and 12b: switched noise filter circuit 46 comprises a voltage source 150 which produces an offset voltage $V_0$, at its output, an offset voltage switch 152 connected between the output of voltage source 150 and $V_{fb}$, and a MMV 154. Offset voltage switch 152 is controlled by the Q output of MMV 154, which is triggered by the $\overline{Q}$ output of latch 130. When so arranged, MMV 154 is triggered when switching element 10 is opened—i.e., at the beginning of $T_{off}$—and closes offset switch 152 for a fixed time interval controlled by MMV 154. In this way, switch 152 is closed and $V_{os}$ is added to feedback voltage $V_{fb}$ for a fixed time interval during $T_{off}$, and is open throughout the switching cycle's "on" time interval. Offset voltage $V_{os}$ should be applied for a short interval T at the beginning of $T_{off}$, with T<<$T_{off}$ (preferably 10% or less of $T_{off}$)—such that the offset voltage decays to zero or near-zero by the end of $T_{off}$.

Though not shown, the present switched noise filter circuit may also be employed with DC-DC converters using constant-frequency peak-voltage control.

Figure 16:
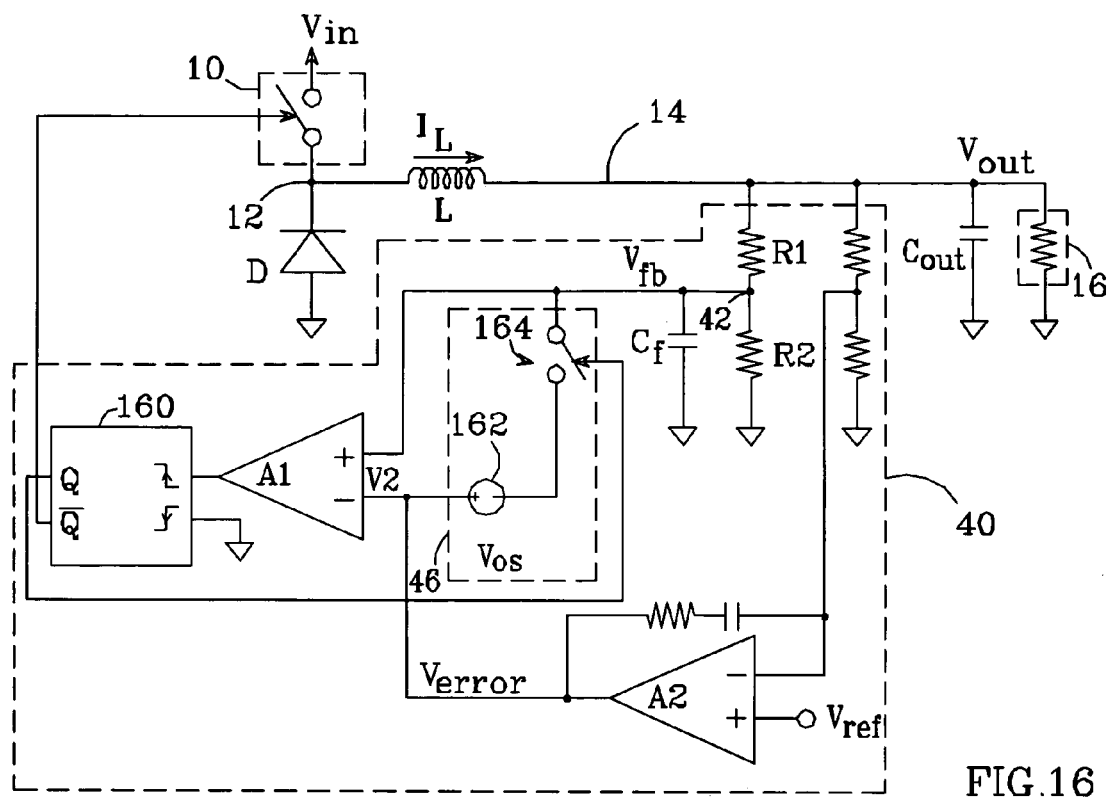
FIG. 16 is a schematic diagram of a switched noise filter circuit per the present invention employed in a DC-DC converter which uses Vsquare control.

The invention is also applicable to DC-DC converters using Vsquare control. An exemplary embodiment of a DC-DC converter using Vsquare control which employs the present switched noise filter circuit is shown in FIG. 16. Here, feedback voltage $V_{fb}$ is connected to the non-inverting input of A1, a voltage $V_{error}$(=$V^2$) which varies with reference voltage $V_{ref}$ is connected to A1's inverting input, and A1's output is connected to trigger a MMV 160 when $V_{fb}$ rises above $V_{error}$. The $\overline{Q}$ output of MMV 160 is connected to switching element 10, so that switching element 10 is opened for a predetermined time interval set by MMV 160 when $V_{fb}$ rises above $V_{error}$.

$V_{error}$ is produced by a voltage error amplifier A2, which is typically connected to $V_{ref}$ at its non-inverting input, to a voltage representative of $V_{out}$ at its inverting input, and which has an RC feedback network connected between its output and inverting input, such that $V_{error}$ varies with difference between $V_{ref}$ and $V_{out}$. When so arranged, the DC-DC converter provides Vsquare control.

In this embodiment, switched noise filter circuit 46 comprises a voltage source 162 which produces an offset voltage $V_{os}$ at its output, and an offset voltage switch 164 connected between the output of voltage source 162 and $V_{fb}$. Offset voltage $V_{os}$ is preferably referred to error voltage $V_{error}$. Offset voltage switch 164 is controlled by the Q output of MMV 160, such that it is closed whenever switching element 10 is open. In this way, $V_{os}$ is subtracted from feedback voltage $V_{fb}$ during the switching cycle's "off" time interval, and is zero during the switching cycle's "on" time interval.

Figure 17:
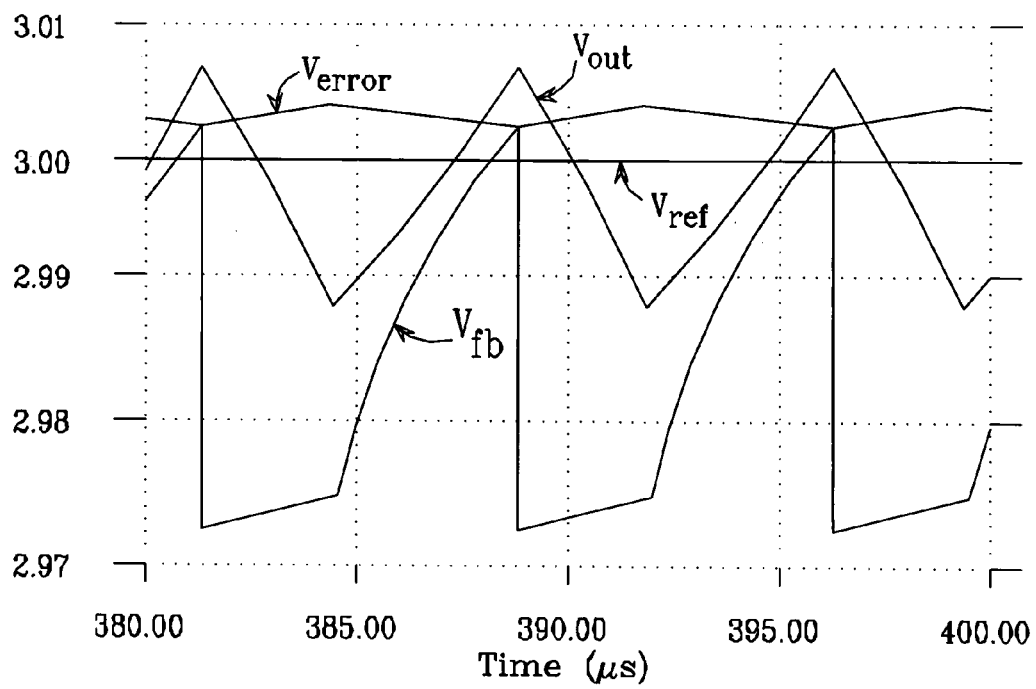
FIG. 17 is a timing diagram which illustrates the operation of the DC-DC converter shown in FIG. 16.

When so arranged, a timing diagram such as that shown in FIG. 17 is obtained. Offset voltage $V_{os}$ is subtracted from $V_{fb}$ during $T_{off}$, pulling feedback node 42 down; this increases the voltage difference between $V_{fb}$ and $V_{ref}$ (and $V_{error}$) and thereby increases the noise margin. With an increased noise margin, the effect of noise picked up at feedback voltage node 42 is reduced.

In this case, $T_{on}$ is the immediate modulated interval. $V_{os}$ is applied for the entire duration of $T_{on}$, and is disconnected from feedback node 42 at the beginning of subsequent interval $T_{off}$, allowing $V_{fb}$ to gradually decay toward V2 due to the natural discharge of filter capacitor $C_f$ through the resistive divider.

Figure 18A:
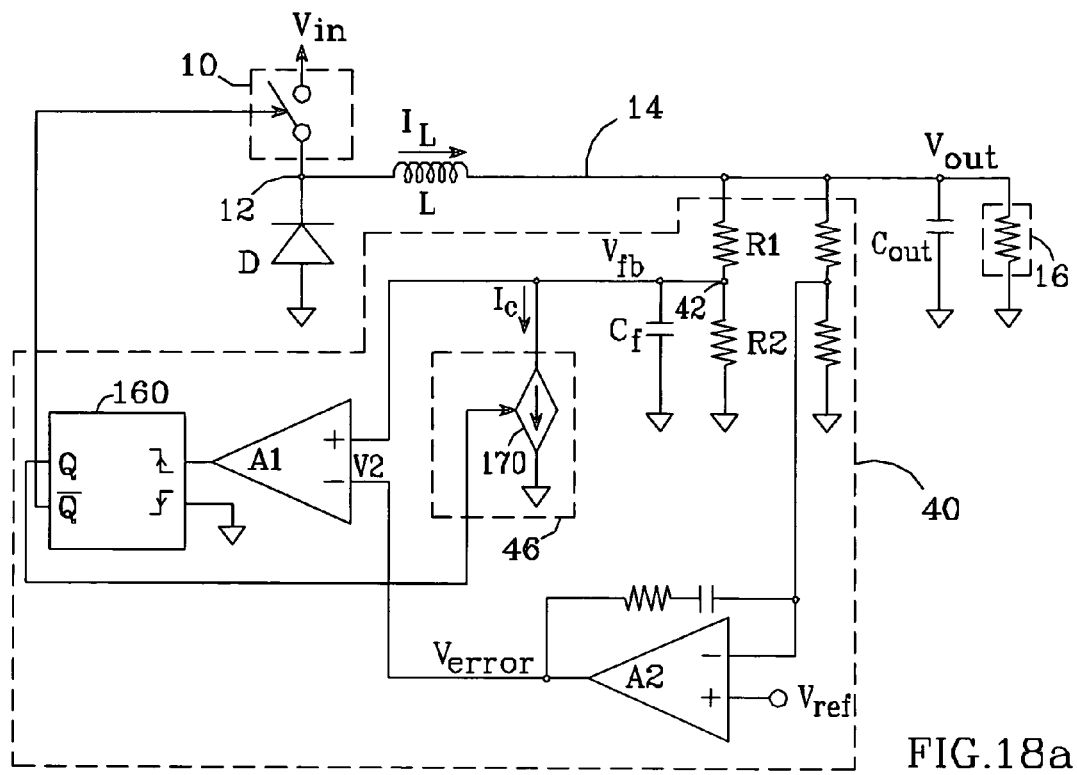
FIG. 18a is a schematic diagram of an alternative embodiment of a switched noise filter circuit per the present invention employed in a DC-DC converter which uses Vsquare control.
Figure 18B:
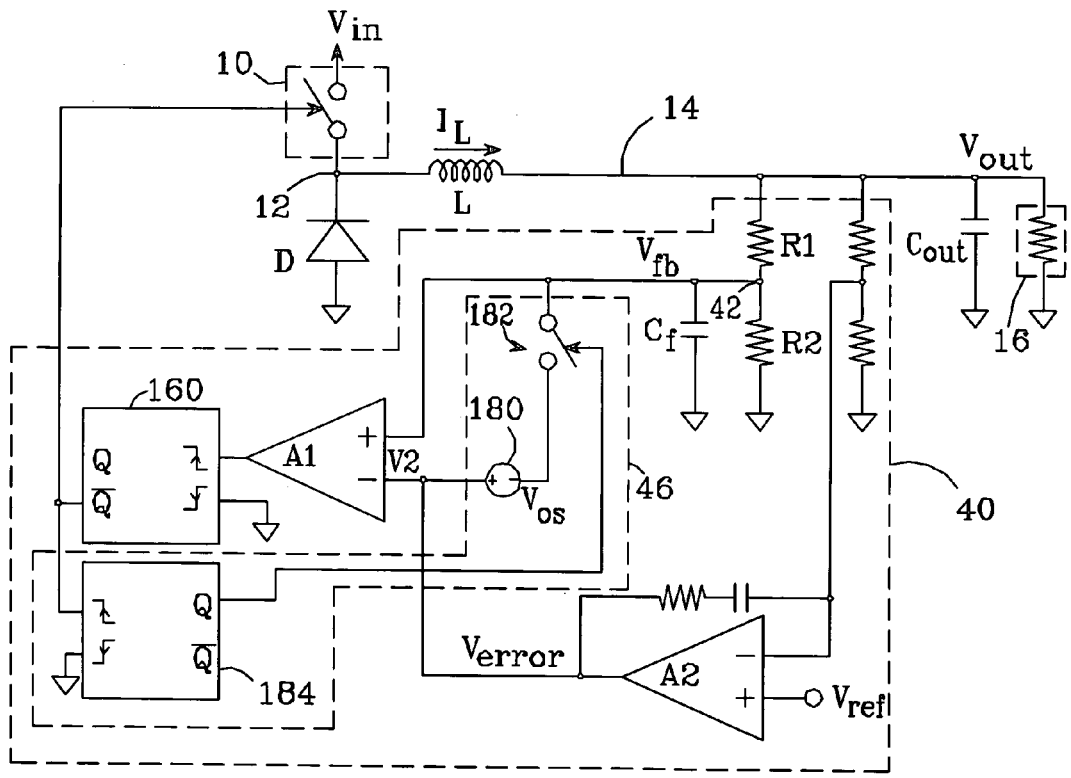
FIG. 18b is a schematic diagram of another alternative embodiment of a switched noise filter circuit per the present invention employed in a DC-DC converter which uses Vsquare control.

Alternative embodiments of DC-DC converters which use Vsquare control and employ the present switched noise filter circuit are shown in FIGS. 18a and 18b. The configuration shown in FIG. 18a is similar to that shown in FIGS. 4, 12a, and 15a: switched noise filter circuit 46 comprises a current source 170 which is controlled by the Q output of MMV 160, such that it is activated and produces a discharging current $I_c$ whenever switching element 10 is open, and is de-activated when switching element 10 is closed. When activated during the "off" time interval, current source 170 discharges filter capacitor $C_f$ with discharging current $I_c$. This causes feedback voltage $V_{fb}$ to be decreased during the switching cycle's "off" time interval, such that an improved noise margin is obtained.

In FIG. 18b, a fixed offset voltage is subtracted from the feedback voltage at the beginning of the "on" time interval. This configuration is similar to that shown in FIGS. 6, 12b and 15b: switched noise filter circuit 46 comprises a voltage source 180 which produces an offset voltage $V_{os}$ at its output, an offset voltage switch 182 connected between the output of voltage source 180 and $V_{fb}$, and a MMV 184. Offset voltage switch 182 is controlled by the Q output of MMV 184, which is triggered by the $\overline{Q}$ output of MMV 160. When so arranged, MMV 184 is triggered when switching element 10 is closed—i.e., at the beginning of $T_{on}$, and closes offset switch 182 for a fixed time interval controlled by MMV 184. In this way, switch 182 is closed and $V_{os}$ is subtracted from feedback voltage $V_{fb}$ for a fixed time interval during $T_{on}$, and is open throughout the switching cycle's "off" time interval.

$V_{os}$ should be applied for a short interval T at the beginning of $T_{on}$, with $T<<T_{on}$ (preferably 10% or less of $T_{on}$)—such that the offset voltage decays to zero or near-zero by the end of $T_{on}$—to ensure that the effect of the offset voltage on the normal PWM process, and on the nominal converter operation itself, is negligible.

Note that the embodiments shown in FIGS. 2–18 are merely exemplary. As previously noted, the present switched noise filter circuit can be employed with any DC-DC converter which uses the instantaneous output voltage to establish the duty ratio required for maintaining the output voltage, including those employing constant-on-time valley-voltage control, constant-off-time peak-voltage control, constant-frequency peak-voltage or valley-voltage control, hysteretic control, or Vsquare control.

Also note that, though each of the illustrated embodiments depicts a single switching element connected in series with a rectifier diode D, the invention is equally applicable to converters for which rectifier diode D is replaced with a second switching element, which is turned on when switching element 10 is turned off (and vice versa), respectively, to provide synchronous rectification.

While particular embodiments of the invention have been shown and described, numerous variations and alternate embodiments will occur to those skilled in the art. Accordingly, it is intended that the invention be limited only in terms of the appended claims.

We claim:

1. A DC-DC converter which produces a regulated output voltage and which uses the instantaneous output voltage to establish the duty ratio required for maintaining said output voltage, comprising:

at least one switching element connected between an input voltage and a first node;

an output inductor connected between said first node and an output terminal; and a switching control circuit which cycles said switching element on and off to maintain a desired output voltage at said output terminal, each of said switching cycles comprising an "on" time interval $T_{on}$ during which said switching element is on and connects said first node to said input voltage, and an "off" time interval $T_{off}$ during which said switching element is off and disconnects said first node from said input voltage, said switching control circuit comprising:

a resistive network connected to produce a feedback voltage $V_{fb}$ at a feedback node representative of the instantaneous output voltage at said output terminal;

a capacitance element connected between said feedback node and said converter's local ground; and a comparator which receives $V_{fb}$ at its first input and a voltage V2 which varies with a fixed reference voltage $V_{ref}$ at its second input, said switching control circuit arranged such that at least one of each switching cycle's "on" and "off" time intervals is terminated when $V_{fb}$ crosses V2 due to the natural discharge of the capacitance element through the resistive network, such a time interval being a "modulated" interval; and a switched noise filter circuit arranged to apply an offset voltage to said feedback voltage during at least one of each switching cycle's "on" and "off" time intervals and to disconnect said offset voltage from said feedback voltage by the beginning of the immediate modulated interval or shortly thereafter, thereby allowing $V_{fb}$ to decay toward V2, such that the noise margin between V2 and $V_{fb}$ is increased and the effect of extraneous electromagnetic noise coupled into said feedback voltage is reduced.

2. The DC-DC converter of claim 1, wherein said at least one switching element is a transistor connected to provide a conductive path between said input voltage and said first node when on, said converter further comprising a diode connected between said first node and said local ground which conducts the current in said inductor when said switching element is off.

3. The DC-DC converter of claim 1, wherein said at least one switching element comprises a first transistor connected to provide a conductive path between said input voltage and said first node when on, and a second transistor connected to provide a conductive path between said first node and said local ground when on, said switching control circuit and said first and second transistors arranged such that said first transistor is on and said second transistor is off during an "on" time interval, and said second transistor is on and said first transistor is off during an "off" time interval, such that said first and second transistors provide synchronous rectification.

4. The DC-DC converter of claim 1, wherein said resistive network is a resistive divider comprising a first resistor connected between said output terminal and said feedback node, and a second resistor connected between said feedback node and said local ground.

5. The DC-DC converter of claim 1, wherein said capacitance element comprises a capacitor connected between said feedback node and said local ground.

6. The DC-DC converter of claim 1, wherein said switching control circuit further comprises a first monostable multivibrator (MMV) which produces an output arranged to turn on said switching element for a predetermined time interval when the output of said comparator indicates that said feedback voltage has fallen below V2, said predetermined time interval being a switching cycle's "on" time interval $T_{on}$ and the period between the end of said predetermined time interval and the start of the next predetermined time interval being said switching cycle's "off" time interval $T_{off}$ and its modulated interval, such that said converter provides constant-on-time valley-voltage control.

7. The DC-DC converter of claim 6, wherein said switched noise filter circuit comprises:
a voltage source which produces said offset voltage at an output; and
an offset voltage switch which, when closed, connects said offset voltage to said feedback node such that said offset voltage is added to said feedback voltage, said switched noise filter circuit arranged to operate said offset voltage switch such that it is closed during at least a portion of said switching cycle's "on" time interval and is open during said switching cycle's "off" time interval.

8. The DC-DC converter of claim 7, wherein said switched noise filter circuit is arranged to operate said offset voltage switch such that it is closed for the duration of said switching cycle's "on" time interval.

9. The DC-DC converter of claim 6, wherein said switched noise filter circuit comprises:
a current source which produces a charging current at an output when activated;
said switched noise filter circuit arranged to activate said current source such that said charging current charges said capacitance element during at least a portion of said switching cycle's "on" time interval and to de-activate said current source during said switching cycle's "off" time interval.

10. The DC-DC converter of claim 9, wherein said switched noise filter circuit is arranged to operate said current source such that it is activated for the duration of said switching cycle's "on" time interval.

11. The DC-DC converter of claim 6, wherein said switched noise filter circuit comprises:
a voltage source which produces said offset voltage at an output; and
an offset voltage switch which, when closed, connects said offset voltage to said feedback node such that said offset voltage is added to said feedback voltage, said switched noise filter circuit arranged to operate said offset voltage switch such that it is closed during at least a portion of said "off" time interval and is open during said switching cycle's "on" time interval.

12. The DC-DC converter of claim 11, wherein said switched noise filter circuit is arranged to operate said offset voltage switch at the beginning of said switching cycle's "off" time interval, such that said offset voltage switch is closed for a time T, with T given by:
$T \ll T_{off}$ 13. The DC-DC converter of claim 11, wherein said switched noise filter circuit further comprises a second MMV which produces an output arranged to close said offset voltage switch for a fixed time interval at the start of said switching cycle's "off" time interval $T_{off}$.

14. The DC-DC converter of claim 6, wherein said switched noise filter circuit comprises:
a current source which produces a charging current at an output when activated;
said switched noise filter circuit arranged to activate said current source such that said charging current charges said capacitance element during at least a portion of said switching cycle's "off" time interval and to de-activate said current source during said switching cycle's "on" time interval.

15. The DC-DC converter of claim 1, wherein said switching control circuit further comprises a first monostable multivibrator (MMV) which produces an output arranged to turn off said switching element for a predetermined time interval when the output of said comparator indicates that said feedback voltage has risen above V2, said predetermined time interval being a switching cycle's "off" time interval $T_{off}$ and the period between the end of said predetermined time interval and the start of the next predetermined time interval being said switching cycle's "on" time interval $T_{on}$ and its modulated interval, such that said converter provides constant-off-time peak-voltage control.

16. The DC-DC converter of claim 15, wherein said switched noise filter circuit comprises:
a voltage source which produces said offset voltage at an output; and
an offset voltage switch which, when closed, connects said offset voltage to said feedback node such that said offset voltage is subtracted from said feedback voltage, said switched noise filter circuit arranged to operate said offset voltage switch such that it is closed during at least a portion of said switching cycle's "off" time interval and is open during said switching cycle's "on" time interval.

17. The DC-DC converter of claim 16, wherein said switched noise filter circuit is arranged to operate said switching element such that it is closed for the duration of said switching cycle's "off" time interval.

18. The DC-DC converter of claim 15, wherein said switched noise filter circuit comprises:
a current source which produces a discharging current at an output when activated;
said switched noise filter circuit arranged to activate said current source such that said discharging current discharges said capacitance element during at least a portion of said switching cycle's "off" time interval and to de-activate said current source during said switching cycle's "on" time interval.

19. The DC-DC converter of claim 15, wherein said switched noise filter circuit comprises:
a voltage source which produces said offset voltage at an output; and
an offset voltage switch which, when closed, connects said offset voltage to said feedback node such that said offset voltage is subtracted from said feedback voltage, said switched noise filter circuit arranged to operate said offset voltage switch such that it is closed during at least a portion of said "on" time interval and is open during said switching cycle's "off" time interval.

20. The DC-DC converter of claim 19, wherein said switched noise filter circuit is arranged to operate said offset voltage switch at the beginning of said switching cycle's "on" time interval, such that said offset voltage switch is closed for a time T, with T given by:

$T \ll T_{on}$.

21. The DC-DC converter of claim 19, wherein said switched noise filter circuit further comprises a second MMV which produces an output arranged to close said offset voltage switch for a fixed time interval at the start of said switching cycle's "on" time interval $T_{on}$.

22. The DC-DC converter of claim 1, wherein said switching control circuit further comprises a set-reset latch which is connected to the output of said comparator at its set input and to a periodic clock signal at its reset input, said latch arranged to be set and turn on said switching element when the output of said comparator indicates that said feedback voltage has fallen below $V_{ref}$ and to be reset and turn off said switching element in response to said periodic clock signal, the time said switching element is turned on being a switching cycle's "on" time interval $T_{on}$ and the period between the end of said "on" time interval and the start of the next "on" time interval being said switching cycle's "off" time interval $T_{off}$ and its modulated interval, such that said converter provides constant-frequency valley-voltage control.

23. The DC-DC converter of claim 22, wherein said switched noise filter circuit comprises:
a voltage source which produces said offset voltage at an output; and
an offset voltage switch which, when closed, connects said offset voltage to said feedback node such that said offset voltage is added to said feedback voltage, said switched noise filter circuit arranged to operate said offset voltage switch such that it is closed during at least a portion of said switching cycle's "on" time interval and is open during said switching cycle's "off" time interval.

24. The DC-DC converter of claim 22, wherein said switched noise filter circuit comprises:
a current source which produces a charging current at an output when activated;
said switched noise filter circuit arranged to activate said current source such that said charging current charges said capacitance element during at least a portion of said switching cycle's "on" time interval and to de-activate said current source during said switching cycle's "off" time interval.

25. The DC-DC converter of claim 22, wherein said switched noise filter circuit comprises:
a voltage source which produces said offset voltage at an output; and
an offset voltage switch which, when closed, connects said offset voltage to said feedback node such that said offset voltage is added to said feedback voltage, said switched noise filter circuit arranged to operate said offset voltage switch such that it is closed during at least a portion of said "off" time interval and is open during said switching cycle's "on" time interval.

26. The DC-DC converter of claim 25, wherein said switched noise filter circuit is arranged to operate said offset voltage switch at the beginning of said switching cycle's "off" time interval, such that said offset voltage switch is closed for a time T, with T given by:

$T \ll T_{off}$.

27. The DC-DC converter of claim 1, wherein said comparator has an associated hysteresis voltage $V_{hyst}$, the output of said comparator arranged to turn on said switching element when the output of said comparator indicates that said feedback voltage has fallen below $V_{ref}-(V_{hyst}/2)$, and to turn off said switching element when the output of said comparator indicates that said feedback voltage has risen above said $V_{ref}+(V_{hyst}/2)$, the time said switching element is turned on being a switching cycle's "on" time interval $T_{on}$ and a modulated interval and the time said switching element is turned off being said switching cycle's "off" time interval $T_{off}$ and a modulated interval, such that said converter provides hysteretic control.

28. The DC-DC converter of claim 27, wherein said switched noise filter circuit comprises:
a first voltage source which produces a first offset voltage at an output;
a first offset voltage switch which, when closed, connects said first offset voltage to said feedback node such that said first offset voltage is subtracted from said feedback voltage;
a second voltage source which produces a second offset voltage at an output; and
a second offset voltage switch which, when closed, connects said second offset voltage to said feedback node such that said second offset voltage is added to said feedback voltage;
said switched noise filter circuit arranged to operate said first offset voltage switch such that it is closed during at least a portion of said switching cycle's "on" time interval and is open during said switching cycle's "off" time interval, and to operate said second offset voltage switch such that it is closed during at least a portion of said switching cycle's "off" time interval and is open during said switching cycle's "on" time interval.

29. The DC-DC converter of claim 28, wherein said switched noise filter circuit is arranged to operate said first offset voltage switch at the beginning of said switching cycle's "on" time interval such that said first offset voltage switch is closed for a time T1, with T1 given by:

$T1 \ll T_{on}$, and to operate said second offset voltage switch at the beginning of said switching cycle's "off" time interval such that said second offset voltage switch is closed for a time T2, with T2 given by:

$T2 \ll T_{on}$.

30. The DC-DC converter of claim 1, further comprising a voltage error amplifier which produces an error voltage that varies with the difference between a voltage representative of the instantaneous output voltage and $V_{ref}$, said error voltage being said voltage V2;
wherein said switching control circuit further comprises a first monostable multivibrator (MMV) which produces an output arranged to turn off said switching element for a predetermined time interval when the output of said comparator indicates that said feedback voltage has risen above V2, said predetermined time interval being a switching cycle's "off" time interval $T_{off}$ and the period between the end of said predetermined time interval and the start of the next predetermined time interval being said switching cycle's "on" time interval $T_{on}$ and its modulated interval, such that said converter provides constant-off-time Vsquare control.

31. The DC-DC converter of claim 30, wherein said switched noise filter circuit comprises:
a voltage source which produces said offset voltage at an output; and
an offset voltage switch which, when closed, connects said offset voltage to said feedback node such that said offset voltage is subtracted from said feedback voltage, said switched noise filter circuit arranged to operate said offset voltage switch such that it is closed during at least a portion of said switching cycle's "off" time interval and is open during said switching cycle's "on" time interval.

32. The DC-DC converter of claim 30, wherein said switched noise filter circuit comprises:

a current source which produces a discharging current at an output when activated;

said switched noise filter circuit arranged to activate said current source such that said discharging current discharges said capacitance element during at least a portion of said switching cycle's "off" time interval and to de-activate said current source during said switching cycle's "on" time interval.

33. The DC-DC converter of claim 30, wherein said switched noise filter circuit comprises:

a voltage source which produces said offset voltage at an output; and an offset voltage switch which, when closed, connects said offset voltage to said feedback node such that said offset voltage is subtracted from said feedback voltage, said switched noise filter circuit arranged to operate said offset voltage switch such that it is closed during at least a portion of said "on" time interval and is open during said switching cycle's "off" time interval.

34. The DC-DC converter of claim 33, wherein said switched noise filter circuit is arranged to operate said offset voltage switch at the beginning of said switching cycle's "on" time interval, such that said offset voltage switch is closed for a time T, with T given by:

$T \ll T_{on}$.

* * * * *

UNITED STATES PATENT AND TRADEMARK OFFICE
CERTIFICATE OF CORRECTION

PATENT NO. : 6,958,594 B2
DATED : October 25, 2005
INVENTOR(S) : Richard Redl et al.

It is certified that error appears in the above-identified patent and that said Letters Patent is hereby corrected as shown below:

Column 6,
Line 51, delete "IC" and insert -- $I_c$ --.

Column 8,
Line 8, delete "$V_{os}$" and insert -- $V_{os1}$ --.
Line 27, delete "$V_{os}$" and insert -- $V_{os2}$ --.
Line 35, delete "$V^2$" and insert -- V2 --.

Column 10,
Line 22, delete "$V_o$" and insert -- $V_{os}$ --.
Line 46, delete "$V^2$" and insert -- V2 --.

Signed and Sealed this

Seventh Day of March, 2006

JON W. DUDAS
*Director of the United States Patent and Trademark Office*